United States Patent
Saha et al.

(10) Patent No.: US 9,030,559 B2
(45) Date of Patent: May 12, 2015

(54) CONSTRAINED PARAMETRIC CURVE DETECTION USING CLUSTERING ON HOUGH CURVES OVER A SEQUENCE OF IMAGES

(75) Inventors: Bhaskar Saha, Union City, CA (US); Ajay Raghavan, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 472 days.

(21) Appl. No.: 13/596,608

(22) Filed: Aug. 28, 2012

(65) Prior Publication Data

US 2014/0063244 A1    Mar. 6, 2014

(51) Int. Cl.
*H04N 7/18* (2006.01)
*G06K 9/46* (2006.01)
*G05D 1/02* (2006.01)
*G06K 9/00* (2006.01)
*G06K 9/48* (2006.01)

(52) U.S. Cl.
CPC ............... *G06K 9/4633* (2013.01); *G06K 9/48* (2013.01); *H04N 7/181* (2013.01); *G05D 1/0246* (2013.01); *H04N 7/18* (2013.01); *G06K 9/00785* (2013.01)

(58) Field of Classification Search
CPC .... H04N 7/181; B60R 1/00; B60R 2300/105; G06K 9/4633; G06K 9/48; G06K 9/6204; G06K 9/4604; G06F 17/145; G06T 2207/20061
USPC .................................. 348/148; 382/281, 203
See application file for complete search history.

(56) References Cited

U.S. PATENT DOCUMENTS

| | | | | |
|---|---|---|---|---|
| 5,063,604 | A * | 11/1991 | Weiman | 382/170 |
| 5,379,353 | A * | 1/1995 | Hasegawa et al. | 382/104 |
| 5,384,865 | A | 1/1995 | Loveridge | |
| 5,832,138 | A * | 11/1998 | Nakanishi et al. | 382/281 |
| 8,320,670 | B1 * | 11/2012 | Li et al. | 382/168 |
| 2006/0120590 | A1 * | 6/2006 | Han et al. | 382/154 |

OTHER PUBLICATIONS

Avery Rhodes, et al., "Evaluation of the Accuracy of Stop Bar Video Vehicle Detection at Signalized Intersections," Transportation Research Record: Journal of the Transportation Research Board, No. 1925, Transportation Research Board of the National Academies, Washington, D.C., 2005, pp. 134-145.

Bir Bhanut, et al., "Recognition of Occluded Objects: A Cluster-Structure Algorithm," Pattern Recognition, vol. 20, No. 2, 1987, pp. 199-211.

* cited by examiner

*Primary Examiner* — Michael Lee
(74) *Attorney, Agent, or Firm* — Fay Sharpe LLP

(57) ABSTRACT

A method for automatically detecting a constrained curve over a set of images includes: obtaining a set of one or more binary images of a scene wherein pixels thereof are designated as an edge pixel or not; and, processing at least one of the images. The processing includes: applying a Hough transform to the image to generate an accumulator array; determining Hough peaks from the accumulator array; selecting Hough peaks subject to a set of constraints; determining Hough curve segments for the selected Hough peaks; grouping the Hough curve segments into clusters; selecting from the clusters a cluster having a greatest number of Hough curve segments; and fitting a curve to the Hough curve segments grouped in the selected cluster.

32 Claims, 2 Drawing Sheets

CONSTRAINED PARAMETRIC CURVE DETECTION USING CLUSTERING ON HOUGH CURVES OVER A SEQUENCE OF IMAGES

BACKGROUND

The present inventive subject matter relates generally to the art of image analysis. Particular but not exclusive relevance is found in connection with the analysis of images captured by red light and/or other traffic enforcement cameras. Accordingly, the present specification makes specific reference thereto. It is to be appreciated however that aspects of the present inventive subject matter are also equally amenable to other like applications.

For images captured with red light, traffic enforcement and/or other like automated and/or unattended cameras it is often desirable to detect a parametric curve (e.g., a straight line, ellipse, etc.) therein. For example, it may be desirable to detect and/or otherwise determine the location, length and/or orientation of a stop bar or line painted on a roadway at an intersection or other part of the roadway observed by the camera. However, straight lines or other parametric curves corresponding to such features in captured images under these circumstances may be obscured (e.g., due to insufficient lighting) or occluded (e.g., by an obstruction that may be stationary or moving such as a vehicle). Yet, the successful enforcement of penalties for traffic light violations often depends on capturing a violator inappropriately crossing the stop bar. Accordingly, it can be important to known the location of the stop bar in captured images, e.g., by automatically detecting a line in the captured images which corresponds to the stop bar.

Accordingly, a new and/or improved method, system and/or apparatus for detecting constrained parametric curves over a sequence of one or more images is disclosed which addresses the above-referenced problem(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for automatically detecting a constrained parametric curve over a set of one or more images. The method includes: obtaining a set of one or more binary images of a scene wherein pixels of the binary images are designated as one of an edge pixel or not an edge pixel; and, processing at least one of the binary images. The aforementioned processing includes: applying a Hough transform to the binary image being processed to generate an accumulator array; determining one or more Hough peaks from the accumulator array; selecting one or more Hough peaks subject to a set of one or more constraints; and determining Hough curve segments for the selected Hough peaks. The method further includes: grouping the Hough curve segments into one or more clusters; selecting from the one or more clusters a cluster having a greatest number of Hough curve segments grouped therein; and fitting a curve to the Hough curve segments grouped in the selected cluster, the fit curve representing the constrained parametric curve being detected.

In accordance with other embodiments, there is provided an apparatus that executes the foregoing method and a non-transitory machine-readable medium including a computer program which when executed performs the foregoing method.

In accordance with another embodiment, there is provided a camera system including: a camera that obtains over time a set of one or more images of a scene; and an image processor. The image processor: derives a set of one or more binary images from the set of one or more image obtained by the camera, wherein pixels of the binary images are designated as one of an edge pixel or not an edge pixel; and processes at least one of the binary images. Suitably, the image processor processes at least one of the binary images by: applying a Hough transform to the binary image being processed to generate an accumulator array; determining one or more Hough peaks from the accumulator array; selecting one or more Hough peaks subject to a set of one or more constraints; and determining Hough curve segments for the selected Hough peaks. The image processor further: groups the Hough curve segments into one or more clusters; selects from the one or more clusters a cluster having a greatest number of Hough curve segments grouped therein; and fits a curve to the Hough curve segments grouped in the selected cluster, the fit curve representing a constrained parametric curve being detected by the image processor.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred and/or other embodiment(s) presented herein.

The present specification describes generally a method, process, apparatus and/or system for detecting a parametric curve in a sequence of one or more images captured by a camera, e.g., such as a red light or other traffic enforcement camera or other suitable automated or unmanned camera or the like. In practice, the described method, process, apparatus and/or system analyzes a sequence of one or more images obtained by a camera with substantially fixed framing over a period of time and automatically detects a parametric curve therein which is suitably constrained in the frame, e.g., by orientation, size, position, etc.

In a suitable embodiment, the captured images are converted to gray scale based on luminance values and edges are extracted from the gray scale images to form a binary image (e.g., in which the pixels are designated as either edge pixels or not edge pixels). In other embodiments, features of curves comprising, but not limited to, color, brightness, texture and thickness can be used to extract the edges from the captured (color or gray scale) image to form a binary image. Image pre-processing steps comprising, but not limited to, de-noising, anti-aliasing, contrast enhancement, equalization, erosion and dilation may be performed to facilitate said edge extraction. For each binary image, a Hough transform is suitably computed and Hough curves satisfying the constraints are selected based on results from computing the Hough transform. The Hough curves from all or a subset of the images are clustered together, e.g., using k-means clustering. Suitably, the largest resulting cluster is selected and a final curve fit to the Hough curves in the selected cluster is determined to represent the curve of interest (i.e., the parametric curve which is being detected).

Figure 1:
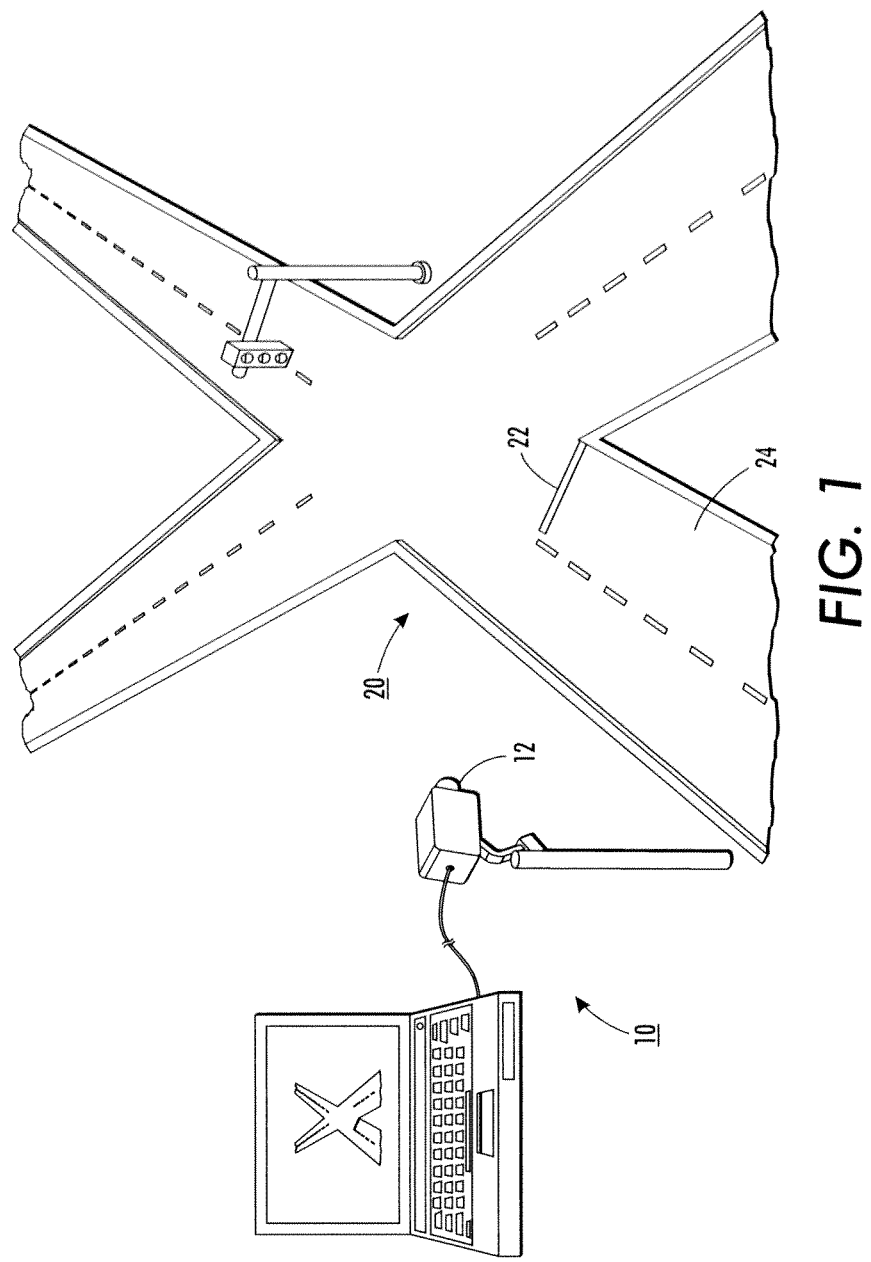
FIG. 1 is a diagrammatic illustration showing an exemplary camera system suitable for practicing aspects of the present inventive subject matter.

With reference now to FIG. 1, an automated and/or unattended camera system 10 includes a camera 12 for selectively capturing and/or obtaining images of a scene 20 within the camera's field-of-view (FoV). Suitably, the camera 12 has a substantially fixed frame on the scene 20. That is to say, the orientation of and/or direction in which the camera 12 is pointed is substantially fixed. In practice, the camera 12 may be a digital camera and may be either a still picture camera or a video camera. When referring herein to a captured or otherwise obtained image from the camera 12, it is intended to mean an image from a picture camera or a still frame from a video camera. Similarly, a sequence of one or more images is intended to mean a series of one or more images sequentially obtained by a picture camera over a period of time or a series of one or more still frames sequentially obtained from a video camera over a period of time. In the illustrated example, the scene 20 at which the camera 12 is aimed and/or pointed is a traffic intersection including a traffic signal and a stop bar 22 painted on otherwise applied to a roadway 24. Alternately, however, it is to be appreciated that in practice other scenes may be the subject of interest.

In the illustrated embodiment, the system 10 further includes a computer 30 or the like that is remotely or otherwise in communication with the camera 12. Suitably, the computer 30 obtains or otherwise receives and analyzes a sequence of one or more images captured by the camera 12 in order to automatically detect a constrained parametric curve therein. In one suitably embodiment, the detected curve may be a line corresponding to the stop bar 22 in the scene 20. In practice, the images obtained or received and analyzed by the computer 30 are digital images, e.g., captured by a digital camera. Optionally, the computer 30 may receive an analog feed which is in turn digitized to obtain digital images for analysis. In one suitable embodiment, the computer 30 obtains or receives and analyzes essentially all the images captured by the camera 12. Alternately, the computer 30 may obtain or receive and analyze a representative sample or other subset of the images captured by the camera 12 at periodic or intermittent intervals or otherwise chosen times. Suitably, the images may be transmitted from the camera 12 to the computer 30 and/or analyzed in real time or near real time or in batches or otherwise.

In general, a Hough transform is used to detect parametric curves. Suitably, for embodiment described herein, a standard Hough transform may be employed or suitable variations thereof, e.g., like a Fast Hough Transform (FHT), Fast Incremental Hough Transform (FIHT), Statistical Hough Transform (SHT), etc., may likewise be employed. For the sake of simplicity, unless otherwise noted, when referring to a Hough transform herein, it shall be intended to include the standard Hough transform as well as suitable variations thereof.

Without loss of generality a straight line detection example with an orientation constraint will now be described for illustrative purposes. In a given image space, a straight line can be described as y=mx+b and can be graphically plotted for each pair of image points (x, y). When working with a Hough transform, it is advantageous to consider the characteristics of the straight line not as image points (x1, y1), (x2, y2), etc., but instead, in terms of its parameters, i.e., the slope parameter m and the intercept parameter b. Accordingly, the straight line y=mx+b can be represented as a point (b, m) in a parameter space. However, one faces the problem that vertical lines in this space can give rise to unbounded values of the parameters m and b. For computational reasons, it can therefore be advantageous to use a different pair of parameters, denoted r and θ, for the lines in the Hough transform. The parameter r represents a distance between the line and the origin, while θ is the angle of a vector from the origin to this closest point. Using this parameterization, the equation of the line can be written as r=x cos θ+y sin θ.

It is therefore possible to associate with each line of the image a pair (r,θ) which is essentially unique. The (r,θ) plane is sometimes referred to as Hough space for the set of straight lines in two dimensions. In general, the Hough transform algorithm uses an array, called an accumulator, to detect the existence of a line or curve. The dimension of the accumulator is equal to the number of unknown parameters of the Hough transform problem. For example, the linear Hough transform problem has two unknown parameters: r and θ. In this case, the two dimensions of the accumulator array would correspond to quantized values for r and θ. For each pixel and its neighborhood, the Hough transform algorithm determines if there is enough evidence of an edge at that pixel. If so, it will calculate the parameters (r and θ, for example) of that line, and then look for the accumulator's bin that the parameters fall into, and increase the value of that bin accordingly. By finding the bins with the highest values, typically by looking for local maxima in the accumulator space, the most likely lines can be extracted, and their (approximate) geometric parameters (r,θ) read off. The next step is to extract the line segments in the image associated with the selected bins.

Suitably, the captured images are obtained in a Red-Green-Blue (RGB) color space. Accordingly, in one suitable embodiment, the RGB image is converted into a gray scale image based on pixel luminance. The gray scale image is then subjected to edge detection, resulting in a binary image where the pixels are designated either as being part of an edge (e.g., white) or not part of an edge (e.g., black).

Again without loss of generality, in one suitable embodiment, the line to be detected is represented by a straight line oriented at +/−10 degrees to the horizontal in the camera image. For example, such may be the case when trying to detect and/or locate a stop bar at a roadway intersection. Consequently, in such an embodiment, the Hough peaks found are suitably constrained such that θ<−80 or θ>80 in the accumulator array. In practice, this operation may be performed for all or a subsampled set of the images in the sequence.

Suitably, the framing of the camera 12 has been adjusted to make the line or feature of interest (e.g., the stop bar 22) the largest of similar orientation-constrained elements in the scene 20. Accordingly, at this stage, of all the line segments extracted by the Hough transform, the line of interest will have more line segments aligned along it than any other edge. Clustering, e.g., such as k-means clustering, may then be applied, e.g., to the slopes and y-intercepts of the Hough lines, and the lines corresponding to the largest cluster are selected to represent the line of interest. Suitably, a straight line fit (or polynomial fit in the more general case) is then constructed based on the selected lines (or curves). The fit line or curve accordingly represents the constrained parametric curve being detected.

Figure 2:
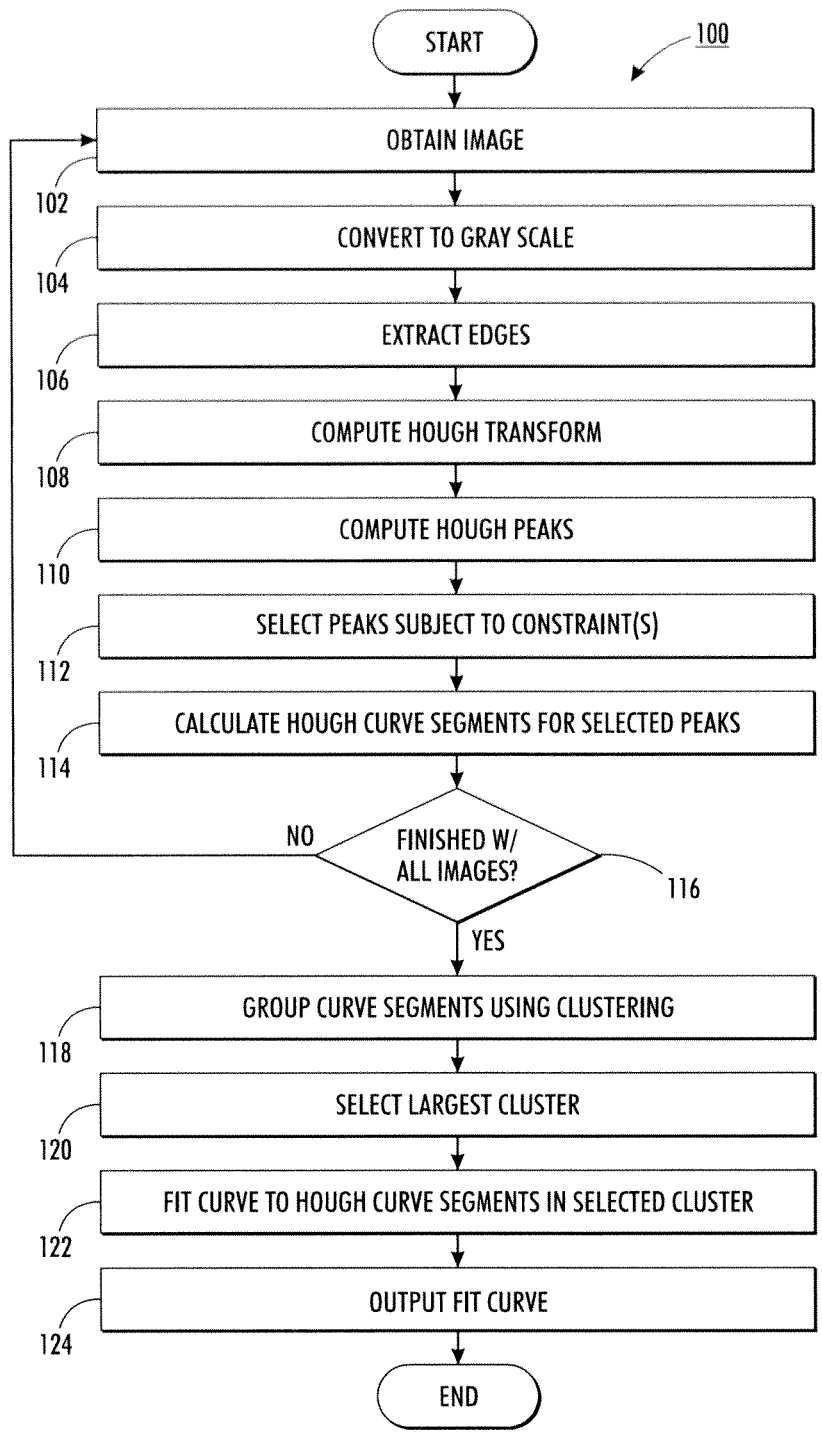
FIG. 2 is a flow chart illustrating an exemplary process for analyzing a sequence of images in accordance with aspects of the present inventive subject matter.

With reference now to FIG. 2, there is shown a flow chart illustrating an exemplary method and/or process 100 by which a sequence of one or more images (e.g., capture or obtained from a substantially fixed frame camera, such as the camera 12) are analyzed, e.g., by the computer 30.

As shown in step 102, an image is obtained. For example, the image may be captured by the camera 12 and transmitted to the computer 30 for analysis. In practice, the captured image may be a digital image that suitably includes pixels or the like which are defined and/or represented in an RGB or other similar color space. At step 104, the obtained image is converted to a gray scale image, e.g., based on a luminance value of the pixels.

At step 106, the gray scale image is subjected to edge detection. Suitably, this results in a binary image where the pixels are designated either as being part of an edge (e.g., white) or not part of an edge (e.g., black). In practice, any suitable edge detection method or algorithm may be employed for this step, e.g., such as a Sobel method, Prewitt method, Roberts method, Laplacian of Gaussian method, zero-cross method, Canny method, etc. In other embodiments, thresholds on computed features of curves comprising, but not limited to, color, brightness, texture and thickness can be used to extract the edges from the captured (color or gray scale) image to form a binary image. Image pre-processing steps comprising, but not limited to, de-noising, anti-aliasing, contrast enhancement, equalization, erosion and dilation may be performed to facilitate said edge extraction.

At step 108, a Hough transform is applied to the binary image to generate an accumulator array, and at step 110, the Hough peaks are computed from the accumulator array generated by the Hough transform. For example, the peaks may be computed or otherwise determined by finding the local maxima in the accumulator array.

At step 112, the Hough peaks subject to a determined constraint or set of constraints are selected. In one suitable embodiment (for example to detect a straight line corresponding to a stop bar in a traffic intersection or otherwise located on a roadway), the constraint may relate to line orientation. In particular, the determined orientation may by plus or minus 10 degrees from the horizontal axis of the image. Accordingly, where the line defining parameters are r and θ in the accumulator space, the constraint may be such that θ<−80 or θ>80 in the accumulator array.

At step 114, the Hough curve segments for the selected peaks are calculated. That is to say, the curve defining parameters are calculated, read off or otherwise determined. Accordingly to the forgoing example, these would include the parameters r and θ defining a straight line segment.

At decision step 116, it is determined if all the images have been analyzed up to this point. If not, then the process 100 loops back to step 102 where the next image in the sequence is obtained. Otherwise, if all the images in the sequence have been analyzed up to this point, then the process 100 continues to step 118.

At step 118, the Hough curve segments from all the analyzed images in the sequence are clustered, e.g., using k-means clustering or the like, and at step 120, the largest cluster (i.e., the cluster having the most Hough curve segments associated therewith) is selected.

At step 122, a curve is fit to the Hough curve segments in the selected cluster. The curve thus fit represents the constrained parametric curve detected by the process 100. Finally, at step 124, the detected curve is output. For example, the detected curve may be displayed and/or superimposed over one or more images captured by the camera 12 and/or the curve parameters (e.g., r and θ) may be output. Suitably, the output may be saved in a memory or other suitable data storage device on the computer 30 or elsewhere and/or visually rendered on a display operatively connected to the computer 30 and/or provided in hardcopy on a printer operatively connected to the computer.

Notably, the foregoing process 100 have numerous advantageous. Without limitation, the process 100: allows for automated detection of the curve of interest; is robust to various lighting conditions, noise and scene elements obstructing the curve; is computationally lightweight; and allows for fast implementation. Suitably, the embodiments described herein may be implemented alone or with other systems and/or method to automate remote checks for traffic signal enforcement and tolling camera systems. Such implementations have the potential to provide higher device uptime and rapid, efficient maintenance. Other traffic-related applications include a) automated classification of a video clip as violation/non-violation, b) demarcating a region for vehicles-of-interest in the images or video with reference to specific quality checks (e.g., often the vehicles in the middle of the intersection appear defocused and one wouldn't want to raise an focus related alarm for those), and c) for traffic signal enforcement cameras that are entirely machine vision based (i.e., they do not use ground loops for vehicle detection). In addition, other applications may include automatically checking a broad variety of other machine vision and camera systems, such as surveillance/security camera systems, automotive inspection and tracking systems, etc., where it might also be desired to monitor activity near a straight edge or line or any other parametric pattern or curve or use such a detected line or curve as a "static scene element" for misalignment, orientation or framing checks, while functioning without human attendants under varying lighting conditions.

While described above with respect to specific examples and/or embodiments, it is to be appreciated that various alternative are contemplated. For example, one alternative would be to use the Hough transform to identify a possibly occluded stop bar in the first frame or image of the sequence, and then apply a temporal median filter over the image or video frame sequence on a region around the detected stop bar and then reapply the Hough transform and clustering algorithm on the temporal median filtered image to detect the stop bar. In yet another alternative, one may search for high contrast objects with narrow aspect ratios in the video frames or images using algorithms like PCA, etc., which would represent the road lane markings. Subsequently, the orientation of such objects can be analyzed to infer the location of the stop bar. Such approaches can also be generalized to constrained curve detection in other imaging or video monitoring applications.

In any event, the above elements, components, processes, methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, analysis, methods, functions, elements and/or components described herein may suitably be implemented via hardware, software, firmware or a combination thereof. For example, the computer 30 may include a processor, e.g., embodied by a computing or other electronic data processing device, that is configured and/or otherwise provisioned to perform one or more of the tasks, steps, processes, analysis, methods and/or functions described herein. For example, the computer 30 or other electronic data processing device employed in the system 10 may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of automatically detecting a constrained parametric curve over a set of one or more images, said method comprising:
    obtaining a set of one or more binary images of a scene wherein pixels of the binary images are designated as one of an edge pixel or not an edge pixel;
    processing at least one of the binary images, said processing including:
        applying a Hough transform to the binary image being processed to generate an accumulator array;
        determining one or more Hough peaks from the accumulator array;
        selecting one or more Hough peaks subject to a set of one or more constraints; and
        determining Hough curve segments for the selected Hough peaks;
    grouping the Hough curve segments into one or more clusters;
    selecting from the one or more clusters a cluster having a greatest number of Hough curve segments grouped therein; and
    fitting a curve to the Hough curve segments grouped in the selected cluster, said fit curve representing the constrained parametric curve being detected.

2. The method of claim 1, wherein said processing is applied to a plurality of the binary images individually and said grouping is applied to the Hough curve segments collectively resulting from said processing of the plurality of the binary images.

3. The method of claim 1, said method further comprising:
    obtaining a set of one or more gray scale images of the scene; and
    generating the obtained set of one or more binary images by applying edge detection to the set of one or more gray scale images.

4. The method of claim 3, said method further comprising:
    obtaining a set of one or more color images of the scene; and
    converting the set of one or more color images into the obtained set of one or more gray scale images based on luminance.

5. The method of claim 4, wherein the obtained set of one or more color images are defined in a first color space, said first color space being a Red-Green-Blue (RGB) color space.

6. The method of claim 1, said method further comprising:
    obtaining a set of one or more color or gray scale images of the scene; and
    generating the obtained set of one or more binary images by applying thresholds on computed features of curves comprising at least one of color, brightness, texture and thickness to extract said edges.

7. The method of claim 6, further comprising performing image processing comprising at least one of de-noising, anti-aliasing, contrast enhancement, equalization, erosion and dilation to facilitate said feature computation.

8. The method of claim 6, wherein the obtained set of one or more color images are defined in a first color space, said first color space being a Red-Green-Blue (RGB) color space.

9. The method of claim 1, wherein said grouping is achieved by applying k-means clustering to the Hough curve segments.

10. The method of claim 1, wherein the set of constraints effectively limits the selected Hough peaks to those Hough peaks which correspond to Hough curve segments which are straight lines having an orientation within a designated range.

11. The method of claim 10, wherein the designated range is plus or minus 10 degrees from horizontal.

12. The method of claim 10, wherein the Hough curve segments are defined by a first parameter representing a distance of a respective Hough curve segment from an origin and a second parameter representing an angle formed by a vector extending from the origin to the respective Hough curve segment.

13. The method of claim 12, wherein the set of constrains includes the angle being less than −80 degree or greater than 80 degrees.

14. The method of claim 1, wherein the scene includes a stop bar on a roadway, and said constrained parametric curve being detected corresponds to said stop bar.

15. The method of claim 1, wherein said obtained set of one or more binary images are derived from a set of one or more images captured over time by a camera having a substantially fixed frame.

16. An apparatus that executes the method of claim 1.

17. A non-transitory machine-readable medium including a computer program which when executed performs the method of claim 1.

18. A camera system comprising:
a camera that obtains over time a set of one or more images of a scene; and
an image processor that:
derives a set of one or more binary images from the set of one or more image obtained by the camera, wherein pixels of the binary images are designated as one of an edge pixel or not an edge pixel;
processes at least one of the binary images by:
applying a Hough transform to the binary image being processed to generate an accumulator array;
determining one or more Hough peaks from the accumulator array;
selecting one or more Hough peaks subject to a set of one or more constraints; and
determining Hough curve segments for the selected Hough peaks;
groups the Hough curve segments into one or more clusters;
selects from the one or more clusters a cluster having a greatest number of Hough curve segments grouped therein; and
fits a curve to the Hough curve segments grouped in the selected cluster, said fit curve representing a constrained parametric curve being detected by said image processor.

19. The camera system of claim 18, wherein said image processor processes a plurality of the binary images individually and groups the Hough curve segments collectively resulting therefrom.

20. The camera system of claim 18, wherein said image processor derives the set of one or more binary images by:
applying edge detection to a set of one or more gray scale images.

21. The camera system of claim 20, wherein the set of one or more images obtained by the camera are color images, and the image processor is further provisioned to convert the color images into the set of one or more gray scale images based on luminance.

22. The camera system of claim 21, wherein the color images are defined in a first color space, said first color space being a Red-Green-Blue (RGB) color space.

23. The camera system of claim 18, wherein said image processor derives the set of one or more binary images by:
applying thresholds on computed features of curves comprising at least one of color, brightness, texture and thickness to extract said edges from a set of one or more color or gray scale images.

24. The camera system of claim 23, wherein said image processor performs image pre-processing steps comprising at least one of de-noising, anti-aliasing, contrast enhancement, equalization, erosion and dilation to facilitate said feature computation.

25. The camera system of claim 23, wherein the color images are defined in a first color space, said first color space being a Red-Green-Blue (RGB) color space.

26. The camera system of claim 18, wherein said image processor groups the Hough curve segments by applying k-means clustering to the Hough curve segments.

27. The camera system of claim 18, wherein the set of constraints effectively limits the selected Hough peaks to those Hough peaks which correspond to Hough curve segments which are straight lines having an orientation within a designated range.

28. The camera system of claim 27, wherein the designated range is plus or minus 10 degrees from horizontal.

29. The camera system of claim 27, wherein the Hough curve segments are defined by a first parameter representing a distance of a respective Hough curve segment from an origin and a second parameter representing an angle formed by a vector extending from the origin to the respective Hough curve segment.

30. The camera system of claim 29, wherein the set of constrains includes the angle being less than −80 degree or greater than 80 degrees.

31. The camera system of claim 18, wherein the scene includes a stop bar on a roadway, and said constrained parametric curve being detected corresponds to said stop bar.

32. The camera system of claim 18, wherein said camera has a substantially fixed frame during times when the one or more images are obtained by the camera.

* * * * *